United States Patent Office 3,519,580
Patented July 7, 1970

3,519,580
PROCESS OF MAKING A WATER-REPELLENT
COMPOSITION FOR THE MANUFACTURE
OF MOLDED PRODUCTS
Herbert William Schou, Palsgaard,
Juelsminde, Denmark
No Drawing. Continuation-in-part of application Ser. No.
426,662, Jan. 19, 1965. This application Sept. 6, 1967,
Ser. No. 665,732
Claims priority, application Denmark, Jan. 22, 1964,
331/64
Int. Cl. C08g 51/18, 51/52, 51/04
U.S. Cl. 260—17.2    9 Claims

ABSTRACT OF THE DISCLOSURE

Water-repellent moldable compositions are prepared from a composition of fibrous organic substances and a hardenable binder by substantially uniformly distributing in said composition a water-repellent additive which remains in pulverulent, non-coalescent condition, such as for example alkane wax, asphalt, bituminous products, oxidized or polymerized fatty acids and the like in mixture with a pulverulent carrier substance. The water-repellent carrier is sorted as to particle size, before, during or after treatment with the water-repellent agent.

---

This application is a continuation-in-part of my patent application Ser. No. 426,662 filed in the U.S. Patent Office Jan. 19, 1965 now abandoned.

This invention relates to a method of making a water-repellent composition for the manufacture of water-repellent molded products, more particularly chipboards, from a mixture of organic fibrous materials and a bonding agent, under application of heat and pressure. The invention also relates to said composition and its utilization.

It has been known to produce chipboards, e.g. of wood, by mixing the chips with a thermosetting binding agent and subjecting the resulting mixture to the action of heat and pressure to cause the binding agent to set.

In order to improve the water-repellent properties of such boards or other molded articles manufactured in a similar manner, it has already been suggested to add water-repellent agents, such as for example high-melting alkanes to the composition to be molded. Such alkanes were used preferably in the form of an emulsion prepared by dispersing 30 to 50% by weight of high-melting alkane in water in the presence of an emulsifying agent. The use of an aqueous alkane emulsion of 30–35% by weight is preferred as it can be used directly in the chipboard manufacture.

For maximum economy in freight and packing so-called self-emulsifying alkane wax is used. However, it is a disadvantage that in this case emulsification of the wax must be carried out in the chipboard factory by vigorous stirring of the self-emulsifying wax with hot water. This is an unpractical procedure, because special machinery is required and a more or less pronounced evaporation of the water will take place during emulsification of the alkane concentration.

The degree of dispersion in the emulsion is important for the quality of the finished chipboards, as a specific mixture of different globule sizes in the emulsion, has been found to produce the best results. In order to obtain optimum effects, a certain percentage of the total amount of alkane should be present in the form of globules larger than those which can be produced in technical emulsions. Such larger globules (10–20μ) would, however, break during compression and cause the formation of grease spots on the surface of the finished objects. The desire for a certain percentage of such "large" globules is based upon the fact that the pores of the pressed objects are of strongly differing sizes and small globules are not able to render the largest pores water-repellent. These conditions constitute a serious drawback of the hitherto known emulsions used.

Furthermore, these emulsions have the drawback that the added water must be evaporated during compression of the material. This consumes energy and through this evaporation further vapor-pores will develop in addition to those formed by the evaporation of water required for the bonding agent, whereby the quality of the board is adversely affected, because such pores permit moisture to penetrate into the board and thereby cause swelling of the molded product.

I have now found that the application of an alkane emulsion and the disadvantages connected therewith, can be avoided by suing a water-repellent additive which has been prepared by mixing a finely divided solid carrier substance with the desired water-repellent agent to an intimate and homogeneous mixture with the water-repellent additive still exhibiting a condition of fine division during its employment in the finished object. To make the water-repellent additive adaptable to the individual requirements of the organic fibrous materials, from which the molded articles are to be made, the carrier substances are graded according to particles size before, during, or after being treated with the water-repelling substance. The carrier substances thus sorted are mixed in the desired proportions.

Said grading may be carried out, for example, by grinding the material to be graded in a mill, with simultaneous or subsequent sifting by means of screens of different mesh size, and the grading may take place before or after impregnation with the water-repellent agent.

I have found that as the finely comminuted fibrous carrier material wood flour is especially suitable and advantageous. However, any other organic particulate fibrous material, such as stems, stem fibers, stem tissues, leaves, hulls, husks, kernels, roots, sawdust, dust formed by grinding wood, powdered rind and/or bark, ground nutshell, cocoa shell, fruit stones, comminuted linen straw, comminuted sugar cane, bagasse, palm leaves, marc of grapes and the like, can likewise be used.

I have further found that in carrying out the present invention it is possible to reduce the addition of alkane wax in comparison with the amount of alkane wax normally used in emulsions for the manufacture of chipboards. In the prior art processes it was necessary to use in the chipboard manufacture about 6% of a 30–35% aqueous alkane emulsion, based on the weight of the chips. According to the present invention about 5–6% of a composition based on the weight of wood flour and containing only 10% alkane wax, has been found to be sufficient for producing at least an equal water-repellent effect in the finished product. If the addition of alkane wax is increased up to e.g. 20%, or if the percentage of the composition containing only about 10% alkane wax is increased, considerably better values for the water-repellent effect are produced, than the values hitherto obtained with emulsions having much higher content of alkane wax.

By the present invention a valuable utilization has been opened to wood flour. Furthermore, according to this invention it is avoided to introduce a hydrophil substance into the product to be molded in the form of the emulsifying agent required for the preparation of the aqueous alkane wax emulsion, which hydrophil substance must necessarily adversely affect the desired hydrophobic properties of the molded product.

A further advantage of the invention is that it is applicable also to the manufacture of boards and other molded articles, in which the bonding agent has a relatively low pH value. This is, for example, the case when sulfite liquor or the like is used as bonding agent. The hitherto employed emulsions of water-repellent materials cannot be used at all with such acid bonding agents because the emulsion would break.

According to an embodiment of the invention fire-resistant products can be manufactured by using as carrier substances for the water-repellent agent, at least in part, dispersed or pulverized inorganic substances which have a fire-inhibiting and inflammation-inhibiting effect. In carrying out this embodiment, mixtures of various carrier substances, such as mixtures of organic carriers, e.g. wood flour, with said inorganic substances can also be used. As examples of said inorganic carrier substances dispersed or pulverized silicic acid, talc, bentonite, ammonium phosphate, ammonium sulfate, zinc chloride, antimony chloride, borax and boric acid are mentioned. Any of these inorganic substances which has the above described effect and is compatible with the ingredients of the composition to be produced, can be used. Some of these materials may possess in themselves hydrophobic properties, such as, for example, the highly dispersed silicon dioxides produced according to German Pat. 973,-859 from a mixture of $SiCl_4$ and an organic silane.

As a water-repellent agent or substance—in addition to alkane wax—any other product having a water-repellent effect and being compatible with the ingredients of the composition to be produced, can be used. Examples of such water-repellents are: asphalts and other bituminous products, oxidized fats and fatty acids, polymerized fats and fatty acids, mineral, vegetable and animal waxes, fats, oils and waste products of industries of mineral, vegetable, animal waxes, fats and oils.

In order to obtain the most homogeneous distributiton of the water-repellent agent, e.g. alkane wax, in the carrier substance, the latter may be impregnated with a solution of the water-repellent in a solvent, according to another characteristic of the invention, the solvent being evaporated after impregnation. As a solvent gasoline can be used, but other volatile solvents of the water-repellent substance may, of course, also be used.

An especially uniform and fine distribution of the water-repellent substance in the carrier substance can be obtained according to this invention by mixing the water-repellent agent with the carrier substance, compressing the resulting mixture and grinding the press cake thus obtained.

Compression of the mixture of wood flour and alkane wax can be, for example, carried out under a pressure of 300 atmospheres of superatmospheric pressure. By this method the alkane wax will be finely and uniformly distributed in the wood flour. In the manufacture of chipboards about 5% of the resulting mixture of alkane wax with the wood flour carrier substance can be added to a mixture of wooden chips with bonding agent, whereupon the chipboards are molded under heat and pressure in conventional manner.

EXAMPLE 1

90 kg. of wood flour serving as carrier substance, are uniformly mixed with 10 kg. of alkane wax having a melting point of, for example, 56–60° C. and containing a maximum of 1.8% of oil. The resulting mixture may be heated for example in a rotating drum, or another mixing device, to about 80° C. for about an hour, whereafter the compressing and grinding operation described above may be performed, and sorting of the particles according to particle size is effected by sieves of the grinding device. The resulting ground mixture is uniformly distributed in conventional manner in the composition to be molded in an amount of about 5% by weight, based on the weight of the composition which is then molded with simultaneous application of heat and pressure in conventional manner.

EXAMPLE 2

100 kg. of wood flour are stirred in a vessel into about 250 kg. of the alkane wax used in the above Example 1, heated to about 100–120° C., whereby the water present in the wood flour is evaporated. The wood flour thus impregnated will settle at the bottom of the vessel, while the surplus alkane separates on top and is mechanically separated from the wood flour by skimming it off. The impregnated wood flour is compressed at a temperature of about 70–80° C. under a pressure of about 300 atmospheres of superatmospheric pressure, whereby a further surplus alkane is squeezed out. The wood flour-alkane wax mixture thus obtained contains about 20–22% by weight of alkane wax. The resulting press cake is ground and used as described in the above Example 1.

EXAMPLE 3

In the above Examples 1 and 2, instead of wood flour, any of the above disclosed other organic particulate fibrous materials can be used, substantially in the same manner as, and under conditions similar to those described in said Examples 1 and 2.

EXAMPLE 4

Hydrophobic moldable compositions distinguished by the additional advantage of increased resistance to fire and inflammability are obtained by using as carrier substance for the water-repellent agent, instead of organic particulate fibrous material, such as wood flour, or in mixture with it, any of the above disclosed dispersed or pulverized inorganic substances which have a fire-retarding and inflammation-retarding effect. The conditions and the manner of applying such inorganic carrier substances are substantially equal to those described in the above Examples 1 and 2. If a mixutre of the above described organic carrier substances with said inorganic carrier substances is used, such mixture may consist, by way of example, of ⅔ by weight of wood flour and ⅓ by weight of silicon dioxide.

Chipboards manufactured according to the present invention, display exceptionally good water-repellent characteristics.

It will be understood that this invention is not limited to the specific embodiments described above and can be carried out with various modifications. Thus, the amount of the water-repellent additive incorporated in the compositions to be molded may vary within the wide limits between about 2 to 50% by weight based on the weight of the composition to be molded and any percentage within these limits can be used. The additive can be uniformly distributed in the moldable composition, e.g. by mixing. The particles of the carrier substances can be sorted by means of screens having different mesh width. The size of the particles resulting from the sorting of particles of carrier substance is defined by the openings of the screens used for sorting, the smallest particles having sizes that can pass through a screen having a mesh width 80 and the largest particles being of sizes which can pass through a screen having a mesh width 10. Each category of sorted particle sizes can be individually treated with the water-repellent substance, whereafter the treated categories are mixed in desired proportions, or the categories of sorted particles are first mixed in desired proportions and then treated with the water-repellent.

It has been known to manufacture chipboards and similar molded articles from chips of dry wood, which are mixed with a hardenable binder, the necessary quantity of solvent for dissolving the binder, a hardening agent and a water-repellent additive. The following specific composition illustrates such a moldable composition for producing chipboards, by way of example:

525 parts by weight of dry wood chips,
60 parts by weight of a thermosetting ureaformaldehyde resin,
1 part by weight of a hardening agent,
52.6 parts by weight of water, and
8.55 parts by weight of an oil-in-water emulsion consisting essentially of ⅓ paraffin wax and ⅔ water.

The proportions of such compositions may, of course, vary and instead of the ureaformaldehyde resin other thermosetting resins, e.g. phenol-formaldehyde resin or phenol-ureaformaldehyde resin and instead of water, or in mixture with it, another solvent can be used.

The molding composition is formed to mats and is then subjected to heat and pressure, in a hydraulic press at a temperature of about 170° C. and a pressure of about 20 atmospheres superatmospheric pressure for about 15 minutes. A substantially similar procedure can be used in molding the compositions prepared according to the present invention.

The parts and percents described herein are by weight if not otherwise stated.

What is claimed is:

1. A process for preparing an improved hydrophobic moldable product from a composition consisting of wood chips, a thermosetting resinous binder and a water-repellent, pulverulent non-coalescent additive with remains in pulverulent non-coalescent condition comprising the following steps: (a) Grinding and sorting a carrier selected from the group consisting of particulate fibrous organic material and fire-inhibiting inorganic substances according to their particle size; the smallest particles of said carrier being of sizes that can pass through a screen having a mesh width 80 and the biggest particles being of sizes which can pass through a screen having a mesh width 10, (b) combining said carrier with 3–30% by weight of a water-repellent substance to form said water-repellent additive, and (c) uniformly distributing in said woodchips-thermosetting resinous binder composition 2–50% by wt., based on the weight of said composition, of said water-repellent, pulverulent non-coalescent additive.

2. A process as claimed in claim 1, wherein each sorted particle size of the carrier is individually treated with the water-repellent material or substance and the particles thus treated are mixed.

3. A process as claimed in claim, wherein the sorted particle sizes of the carrier are mixed and their mixture is subsequently treated with the water-repellent substance.

4. A process as claimed in claim 1, in which sorting according to particle size is carried out by grinding the material to be sorted in a mill and sifting through screens of different mesh size.

5. A process as claimed in claim 1, in which the carrier used is wood flour.

6. A process as claimed in claim 1, in which the carrier used is a fire-inhibiting inorganic substance.

7. A process as claimed in claim 1, in which the carrier is impregnated with a solution of the water-repellent substance, and subsequently the solution is evaporated.

8. A process as claimed in claim 1, in which 90 parts by weight of a carrier are mixed with 10 parts by weight of a water-repellent substance, the resulting mixture is heated to the melting temperature of the water-repellent substance, the heated product is subjected to a pressure of about 300 atmospheres and subsequently to grinding.

9. A process as claimed in claim 1, in which mixing of the carrier with the water-repellent substance is carried out by stirring 100 parts by weight of the carrier substance into about 250 parts by weight of molten water-repellent substance and subjecting the resulting mixture at about 70–80° C. to a pressure of about 300 atmospheres.

References Cited
UNITED STATES PATENTS

| | | | |
|---|---|---|---|
| 1,169,079 | 1/1916 | Lappen | 106—272 |
| 2,581,652 | 1/1952 | Goss | 264—124 XR |
| 2,634,207 | 4/1953 | Miscall | 106—272 |
| 2,635,054 | 4/1953 | Doyle | 106—272 XR |
| 3,021,244 | 2/1962 | Meiler | 264—120 XR |
| 3,085,040 | 4/1963 | Lovering et al. | 106—272 XR |

FOREIGN PATENTS

| | | |
|---|---|---|
| 919,495 | 2/1963 | Great Britain. |
| 1,335,219 | 7/1963 | France. |

WILLIAM H. SHORT, Primary Examiner

E. WOODBERRY, Assistant Examiner

U.S. Cl. X.R.
260—17.3, 38, 39